(12) United States Patent
Lyu et al.

(10) Patent No.: US 9,832,443 B2
(45) Date of Patent: *Nov. 28, 2017

(54) METHOD AND DEVICE FOR TRANSMITTING HIGH-DEFINITION VIDEO SIGNAL

(71) Applicant: ZHEJIANG DAHUA TECHNOLOGY CO., LTD., Hangzhou, Zhejiang (CN)

(72) Inventors: Bingyun Lyu, Zhejiang (CN); Jiangming Zhu, Zhejiang (CN); Jun Yin, Zhejiang (CN)

(73) Assignee: ZHEJIANG DAHUA TECHNOLOGY CO., LTD., Zhejiang (CN)

( * ) Notice: Subject to any disclaimer, the term of this patent is extended or adjusted under 35 U.S.C. 154(b) by 76 days.

This patent is subject to a terminal disclaimer.

(21) Appl. No.: 14/985,382

(22) Filed: Dec. 30, 2015

(65) Prior Publication Data

US 2016/0112692 A1    Apr. 21, 2016

Related U.S. Application Data

(63) Continuation of application No. 14/391,621, filed as application No. PCT/CN2013/075709 on May 16, 2013, now Pat. No. 9,232,204.

(30) Foreign Application Priority Data

May 16, 2012   (CN) .......................... 2012 1 0150743

(51) Int. Cl.
*H04N 9/475*    (2006.01)
*H04N 11/14*    (2006.01)
(Continued)

(52) U.S. Cl.
CPC ............. *H04N 11/14* (2013.01); *H04N 5/067* (2013.01); *H04N 5/40* (2013.01); *H04N 9/44* (2013.01); *H04N 9/78* (2013.01); *H04N 11/002* (2013.01)

(58) Field of Classification Search
USPC ....... 348/520, 521, 500, 441, 445, 469, 478, 348/480, 489, 642, 705, 723, 608, 636, (Continued)

(56) References Cited

U.S. PATENT DOCUMENTS 4,630,099 A    12/1986   Rzeszewski
4,652,903 A    3/1987    Lucas
(Continued)

FOREIGN PATENT DOCUMENTS

CN    101064820 A    10/2007
CN    101184213 A    5/2008
(Continued)

OTHER PUBLICATIONS

International Search Report for PCT/CN2013/075709 dated Aug. 29, 2013, 2 pages.

*Primary Examiner* — Jefferey F Harold
*Assistant Examiner* — Mustafizur Rahman
(74) *Attorney, Agent, or Firm* — Metis IP LLC

(57) ABSTRACT

Provided in embodiments of the present invention are a method and device for transmitting a high-definition video signal, comprising: isolating from the high-definition video signal a brightness signal and a chrominance signal, and, by using an analog signal transmission mode, using non-overlapping frequency hands to transmit respectively the brightness signal and the chrominance signal. The solution of the present invention employs the analog signal transmission method, utilizes independent frequency bands to transmit respectively the brightness signal and the chrominance sig- (Continued)

nal, and ensures that the brightness signal and the chrominance signal do not affect each other, thus ensuring video quality and timeliness of the high-definition video signal when transmitted over a long distance.

18 Claims, 2 Drawing Sheets

(51) Int. Cl.
    *H04N 11/24*     (2006.01)
    *H04N 5/067*     (2006.01)
    *H04N 5/40*     (2006.01)
    *H04N 9/44*     (2006.01)
    *H04N 9/78*     (2006.01)

(58) Field of Classification Search
    USPC ............. 348/680, 693, 222.1, 240.01, 194
    See application file for complete search history.

(56) References Cited

U.S. PATENT DOCUMENTS

| | | | |
|---|---|---|---|
| 5,006,926 A | 4/1991 | Tsinberg | |
| 5,353,118 A * | 10/1994 | Cho | H04N 5/144 348/451 |
| 5,373,328 A * | 12/1994 | Hong | H04N 9/78 348/666 |
| 5,465,158 A * | 11/1995 | Morioka | H04N 9/83 348/489 |
| 5,699,471 A * | 12/1997 | Furuhata | G11B 5/00878 386/263 |
| 5,786,866 A * | 7/1998 | Sani | H04N 9/45 348/520 |
| 5,892,879 A * | 4/1999 | Oshima | H03M 13/256 348/726 |
| 5,907,368 A * | 5/1999 | Nakamura | H04N 9/44 348/513 |
| 6,204,884 B1 | 3/2001 | Lee | |
| 6,278,495 B1 | 8/2001 | Lowe et al. | |
| 6,434,519 B1 * | 8/2002 | Manjunath | G10L 19/0208 704/201 |
| 6,462,790 B1 | 10/2002 | Lowe et al. | |
| 6,483,550 B1 | 11/2002 | Murata et al. | |
| 6,504,996 B1 * | 1/2003 | Na | H04L 12/40117 348/563 |
| 6,803,951 B1 | 10/2004 | Matsukawa et al. | |
| 7,298,418 B2 * | 11/2007 | Delanghe | H04N 9/78 348/194 |
| 7,571,456 B1 | 8/2009 | Joo et al. | |
| 2003/0053797 A1 * | 3/2003 | Oshima | G11B 20/10 386/201 |
| 2004/0070668 A1 * | 4/2004 | Abe | H04N 5/23241 348/65 |
| 2004/0161108 A1 | 8/2004 | Ando et al. | |
| 2004/0239685 A1 | 12/2004 | Kiyokawa et al. | |
| 2005/0117068 A1 | 6/2005 | Moses et al. | |
| 2005/0174486 A1 * | 8/2005 | Delanghe | H04N 9/78 348/505 |
| 2006/0077301 A1 * | 4/2006 | Okamoto | H04N 7/0132 348/638 |
| 2006/0109379 A1 * | 5/2006 | Ahn | H04N 11/186 348/491 |
| 2006/0146191 A1 * | 7/2006 | Kim | H04N 19/176 348/557 |
| 2006/0215037 A1 * | 9/2006 | Tsunekawa | H04N 5/145 348/211.99 |
| 2006/0221242 A1 * | 10/2006 | Huang | H03L 7/08 348/572 |
| 2007/0002173 A1 | 1/2007 | Cha et al. | |
| 2007/0024706 A1 * | 2/2007 | Brannon, Jr. | H04N 7/17318 348/142 |
| 2007/0024747 A1 | 2/2007 | Heo | |
| 2007/0146545 A1 * | 6/2007 | Iwahashi | H04N 5/45 348/553 |
| 2007/0200840 A1 * | 8/2007 | Clynes | G09G 5/363 345/204 |
| 2009/0033799 A1 * | 2/2009 | Kim | H04N 9/78 348/665 |
| 2010/0074535 A1 * | 3/2010 | Bennett | H04N 19/172 382/209 |
| 2010/0194978 A1 * | 8/2010 | Kaneko | H04N 9/78 348/454 |
| 2010/0202513 A1 * | 8/2010 | Arakawa | H04N 19/172 375/240.03 |
| 2012/0114063 A1 * | 5/2012 | Bo | H04L 27/2647 375/285 |
| 2012/0257082 A1 * | 10/2012 | Kato | H04N 5/2357 348/229.1 |
| 2012/0268479 A1 * | 10/2012 | Parmar | G09G 3/2048 345/597 |
| 2013/0057567 A1 * | 3/2013 | Frank | G06F 3/1454 345/589 |
| 2014/0104457 A1 * | 4/2014 | Kato | H04N 9/74 348/239 |
| 2015/0304690 A1 * | 10/2015 | Allen | H04N 1/00127 348/14.13 |

FOREIGN PATENT DOCUMENTS

| | | |
|---|---|---|
| CN | 102014277 B | 4/2011 |
| CN | 102088614 A | 6/2011 |
| CN | 102111609 A | 6/2011 |
| CN | 201937769 | 8/2011 |
| CN | 102724518 B | 10/2012 |
| EP | 1617650 A1 | 1/2006 |
| EP | 1617663 A1 | 1/2006 |
| EP | 1850550 A2 | 10/2007 |

\* cited by examiner

METHOD AND DEVICE FOR TRANSMITTING HIGH-DEFINITION VIDEO SIGNAL

CROSS-REFERENCE TO RELATED APPLICATIONS

The present invention is a continuation of U.S. application Ser. No. 14/391,621 filed on Oct. 9, 2014, which is a U.S. National Stage entry under 35 U.S.C. §371 of International Application No. PCT/CN2013/075709 filed on May 16, 2013, which in turn claims priority to Chinese Patent Application No. 201210150743.8 filed on May 16, 2012, all entitled "Method and Device for Transmitting High-Definition Video Signal," each of which is hereby incorporated by reference.

This application claims priority to Chinese Patent Application No. 201210150743.8, filed with the Chinese Patent Office on May 16, 2012 and entitled "Method and device for transmitting high-definition video signal", the content of which is hereby incorporated by reference in its entirety.

FIELD

The present invention relates to the field of communications and particularly to a method of and device for transmitting a high-definition video signal.

BACKGROUND

In the safety and guard industry, a high-definition video signal, e.g., a video stream acquired by a high-definition video camera, is generally transmitted over a network after the high-definition video signal is encoded, or transmitted by transmitting original data of the high-definition video signal using a data transmission standard of Serial Digital Interface (SDI).

A network line is required for the high-definition video signal to be transmitted over the network after being encoded, which results in a loss of the quality of video and a delay of an image. The problems of a loss of the quality of video and a delay of an image may be exacerbated for transmission over a long distance so that it may be difficult to guarantee the quality of video and the real-time characteristic of the high-definition video signal transmitted over a long distance.

When the high-definition video signal is transmitted by transmitting the original data using the data transmission standard of SDI, the transmission distance is limited due to a large amount of data of the high-definition video signal ensuring the quality of data transmission. For example, the high-definition video signal in the 720p format or the 1080p format has to be transmitted over the longest distance below 100 meters in order to ensure the quality of data transmission. Thus the video quality of the high-definition video signal transmitted over a long distance cannot be guaranteed by transmitting the original data using the data transmission standard of SDI.

The traditional analog video transmitted over a long distance generally applies a Composite Video Blanking and Synchronization (CVBS) method, which can not satisfy the transmission of the high-definition video signal above 960H.

In summary, the quality of video and the real-time characteristic required for the high-definition video signal to be transmitted can be guaranteed in none of the existing long-distance transmission solutions.

SUMMARY

Embodiments of the invention provide a method of and device for transmitting a high-definition video signal so as to address the problem in the prior art of the difficulty to guarantee the quality of video and the real-time characteristic in transmission of a high-definition video signal over a long distance.

A method of transmitting a high-definition video signal includes:

separating a brightness signal and a chrominance signal from the high-definition video signal; and transmitting the brightness signal and the chrominance signal using a transmission mode of an analog signal;

wherein the brightness signal and the chrominance signal are transmitted in non-overlapping bands.

A device for transmitting a high-definition video signal includes:

a separation module configured to separate a brightness signal and a chrominance signal from the high-definition video signal; and a transmission module configured to transmit the brightness signal and the chrominance signal using a transmission mode of an analog signal, wherein the brightness signal and the chrominance signal are transmitted in non-overlapping bands.

With the solutions according to the embodiments of the invention, a brightness signal and a chrominance signal are separated from a high-definition video signal and transmitted respectively in non-overlapping bands using a transmission mode of an analog signal. With the inventive solutions, the brightness signal and the chrominance signal can be transmitted, using a transmission method of an analog signal, respectively in the separate bands, to thereby ensure no influence of the brightness signal and the chrominance signal upon each other so as to guarantee the quality of video and the real-time characteristic of the high-definition video signal transmitted over a long distance.

DETAILED DESCRIPTION OF THE EMBODIMENTS

Embodiments of the invention provide a method of transmitting a high-definition video signal based on an analog signal to thereby transmit the high-definition video signal without any compression, loss of the signal or delay thereof in transmission of the high-definition video signal over a long distance so as to accommodate required transmission of the high-definition video signal in the safety and guard industry.

The solutions of the inventions will be described below with reference to the drawings and respective embodiments thereof.

First Embodiment

Figure 1:
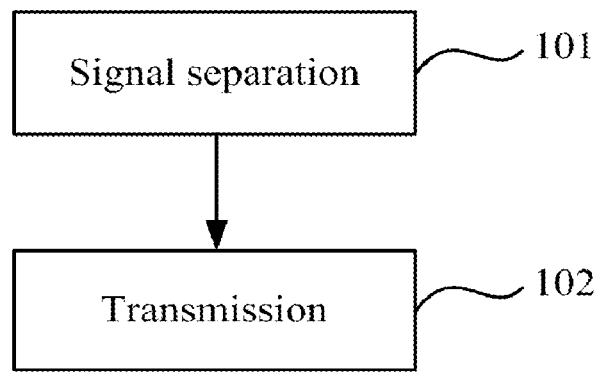
FIG. 1 is a flow chart of a method of transmitting a high-definition video signal according to a first embodiment of the invention.

The first embodiment of the invention provides a method of transmitting a high-definition video signal, and FIG. 1 illustrates a flow of this method including:

The step 101 is to perform signal separation.

A brightness signal and a chrominance signal in the high-definition video signal need to be transmitted respectively in this embodiment. Thus in this step, the high-definition video signal needs to be processed to separate the brightness signal and the chrominance signal from the high-definition video signal so that the separated brightness signal and chrominance signal can be operated on subsequently.

The step 102 is to perform transmission.

In this embodiment, the high-definition video signal is transmitted using the transmission method of an analog signal. Thus in this step, the brightness signal and the chrominance signal can be transmitted using the transmission mode of an analog signal, and the brightness signal and the chrominance signal can be transmitted in totally separate bands which do not overlap so as to ensure no influence of the brightness signal and the chrominance signal upon each other.

In this step, the brightness signal can be converted into a quantized brightness value, and particularly the brightness signal can be converted into a quantized brightness value by encode mode for the baseband transmission. The chrominance signal is modulated and then loaded onto an intermediate-frequency carrier to generate a quantized value of the chrominance signal modulated over the carrier, the quantized brightness value and the quantized value of the chrominance signal modulated over the carrier are superimposed, and then the superimposed signal is converted into the analog signal for transmission. Particularly the superimposed signal can be converted into the analog signal using a high-speed digital-analog converter.

In this embodiment, the brightness signal and the chrominance signal can be transmitted over a coaxial cable. Thus the analog signal obtained by conversion can be output onto the coaxial cable for transmission. In view of the attenuating characteristic of the frequency of the signal in long-distance transmission over the coaxial cable, the signal at a low frequency can accommodate the requirement of a long distance transmission. Thus the brightness signal and the chrominance signal can be set to be transmitted in the bands with their highest frequencies no more than a preset threshold so as to transmit the high-definition video signal over a long distance while guaranteeing the reliability and the stability of transmission, where the preset threshold can be set no less than 20 MHz and preferably at 20 MHz to 40 MHz.

The bandwidth of the band in which the brightness signal is transmitted can be determined from a required horizontal resolution of the high-definition video signal, e.g., a required horizontal resolution of a high-definition video is at least above 900 lines or more. Furthermore the bandwidth of the band in which the brightness signal is transmitted can be determined from a required frame rate and the required horizontal resolution; and the bandwidth of the band in which and the frequency of the carrier over which the chrominance signal can be transmitted from a required color resolution of the high-definition video signal. Furthermore the frequency of the carrier can be determined from a preset frequency gap between the band of the intermediate-frequency carrier and the band in which the brightness signal is transmitted so that the brightness signal and the chrominance signal can be better separated using a filter during transmission and sampling.

In this embodiment, the brightness signal can be transmitted in a baseband at a low frequency of 0 to fy MHz, and the chrominance signal can be transmitted over the intermediate-frequency carrier with the bandwidth of fcd MHz and the frequency fc MHz of the carrier, where the brightness signal and the chrominance signal are transmitted in the non-overlapping bands.

Particularly the bandwidth of the band, in which the brightness signal is transmitted over the coaxial cable, is determined from the required frame rate and the required horizontal resolution, for example, when the horizontal resolution is 720P and the frame rate is 25 frames per second, the brightness signal can be transmitted in the band of 0 to 15 MHz. If the bandwidth of the band of the intermediate-frequency carrier is determined as 4 MHz, then the frequency of the carrier can be determined from the preset frequency gap. For example, given the band of 0 to 15 MHz in which the brightness signal is transmitted and the bandwidth 4 MHz of the band of the intermediate-frequency carrier, if the preset frequency gap is 1 MHz, then the frequency of the carrier can be 18 MHz; and given the band of 0 to 14 MHz in which the brightness signal is transmitted and the bandwidth 4 MHz of the band of the intermediate-frequency carrier, if the preset frequency gap is 2 MHz, then the frequency of the carrier can be 18 MHz. All of the low-frequency bandwidth, the frequency gap and the frequency of the carrier described above can be adjusted dependent upon a real condition.

Also in this embodiment, a clock synchronization signal is coupled at a blanking location of the high-definition video signal as a clock source of the chrominance signal for recovering sample in order to ensure the chrominance signal to be synchronized while being sampled.

The solution according to the first embodiment of the invention will be described below by way of a particular example where for the required resolution of 720P and the required frame rate of 25 frames per second, the brightness signal is transmitted in the baseband at a low-frequency of 0 to fy MHz and the chrominance signal is transmitted over the intermediate-frequency carrier with a bandwidth of fcd MHz and the frequency fc MHz of the carrier.

Second Embodiment

Figure 2:
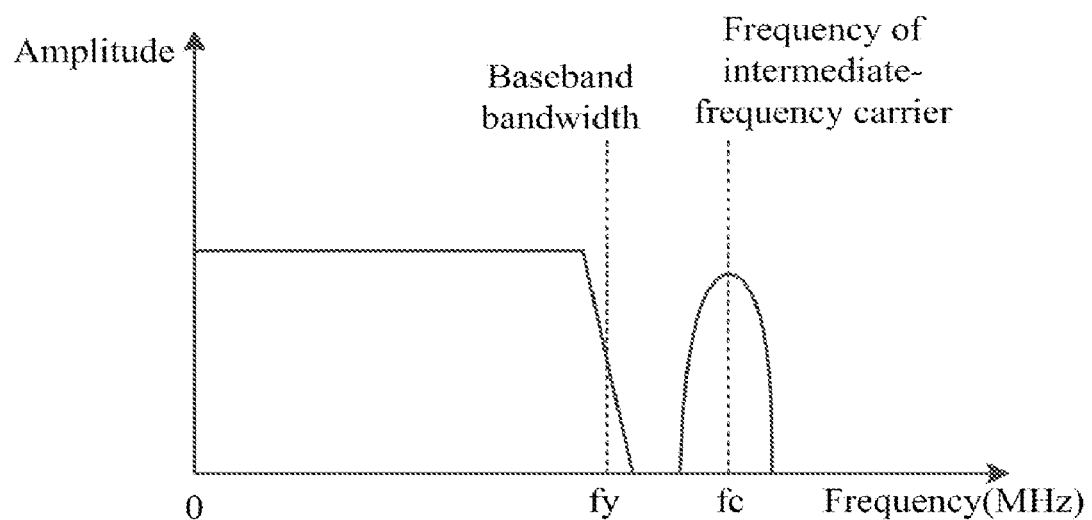
FIG. 2 is a diagram of an analog signal of a high-definition video signal of 720P in the frequency domain according to a second embodiment of the invention.

FIG. 2 illustrates a diagram of the analog signal of the high-definition video signal of 720P in the frequency domain, where the analog signal is divided into signal bandwidths for all of which upper limits are determined as fmax, typically at 20 MHz, according to the attenuation criterion of the signal over the coaxial cable in order to accommodate over the requirement of a long distance transmission. The bandwidth of the brightness signal is determined as fy MHz, typically 15 MHz, from the required frame rate and the required horizontal resolution. The bandwidth of the chrominance signal is determined as fcd, typically 4 MHz, from the required color resolution of the high-definition video signal, and furthermore the frequency of the carrier of the chrominance signal is determined as fc MHz from the preset frequency gap, where the preset frequency gap is typically 1 MHz, that is, the frequency of the carrier is typically 18 MHz. Moreover the respective bands occupied by the brightness signal and the chrominance signal do not overlap, and the signals are transmitted in their respective exclusive bands.

Figure 3:
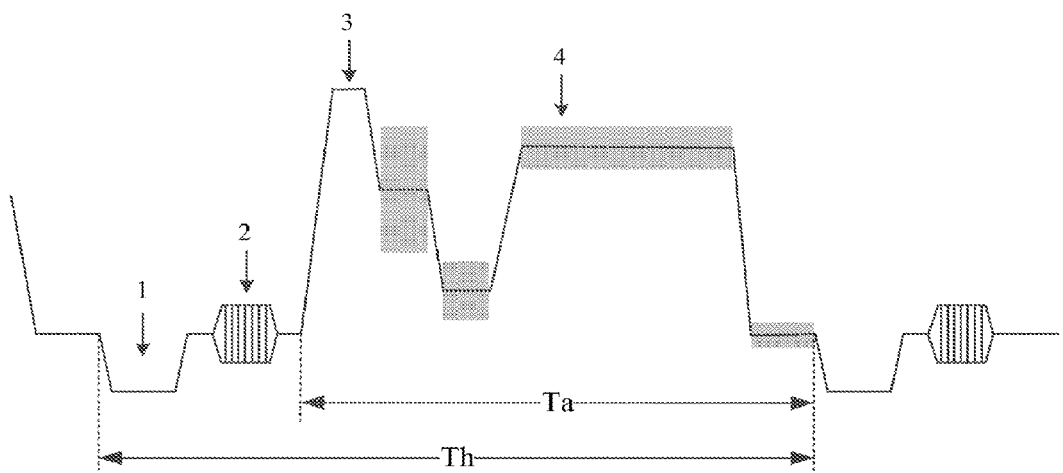
FIG. 3 is a diagram of an analog signal of the high-definition video signal of 720P in the time domain according to the second embodiment of the invention.

FIG. 3 illustrates a diagram of the analog signal of the high-definition video signal of 720P in the time domain, where the reference numeral 1 denotes a synchronization header of each row of signal in each frame of image in the high-definition video signal, the reference numeral 2 denotes a clock synchronization signal of the chrominance signal, the reference numeral 3 denotes an electric signal (an analog brightness signal) of the brightness in the analog signal obtained by conversion using the high-speed digital-analog converter, and the reference numeral 4 denotes an electric signal (an analog chrominance signal) of the chrominance modulated over the carrier in the analog signal obtained by conversion using the high-speed digital-analog converter; and where Th represents a period of time occupied for transmission of each row of each frame of image in the high-definition video signal, which can be up to 52 μs for the high-definition video signal of 720P, i.e., the high-definition video signal including 1280×720 active pixels, in the solution according to the first embodiment of the invention; and Ta represents a valid use period of time for transmission of the brightness signal and the chrominance signal in each row of each frame of image in the high-definition video signal, which can be up to 42 μs for the high-definition video signal of 720P in the solution according to the first embodiment of the invention, that is, the transmission of the brightness signal and the chrominance signal in each row can be completed in this period of time. As can be apparent, the real-time characteristic of the transmitted high-definition video signal can be well guaranteed in the solution according to the first embodiment of the invention.

The following device can be provided based upon the same inventive idea as the first embodiment and the second embodiment of the invention.

Third Embodiment

Figure 4:
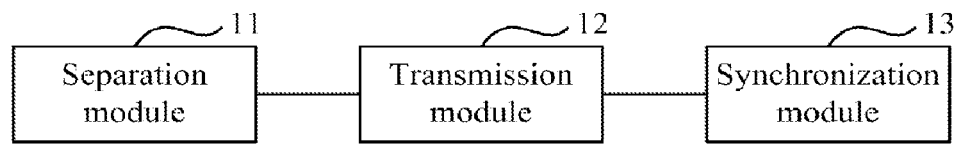
FIG. 4 is a schematic structural diagram of a device for transmitting a high-definition video signal according to a third embodiment of the invention.

The third embodiment of the invention provides a device for transmitting a high-definition video signal, and FIG. 4 illustrates a schematic structural diagram of the device including:

A separation module 11 is configured to separate a brightness signal and a chrominance signal from the high-definition video signal.

A transmission module 12 is configured to transmit the brightness signal and the chrominance signal using a transmission mode of an analog signal, where the brightness signal and the chrominance signal are transmitted in non-overlapping bands.

Particularly the transmission module 12 is further configured to convert the brightness signal into a quantized brightness value, to modulate and then load the chrominance signal onto an intermediate-frequency carrier to generate a quantized value of the chrominance signal modulated over the carrier, to superimpose the quantized brightness value and the quantized value of the chrominance signal modulated over the carrier, and to convert the superimposed signal into an analog signal for transmission.

Particularly the transmission module 12 is further configured to output the analog signal obtained by conversion onto a coaxial cable for transmission, where both the highest frequencies of the bands, in which the brightness signal and the chrominance signal are transmitted, are no more than a preset threshold.

The transmission module 12 can be further configured to determine the bandwidth of the band in which the brightness signal is transmitted from a required horizontal resolution of the high-definition video signal and to determine the bandwidth of the band in which and the frequency of the carrier over which the chrominance signal is transmitted from a required color resolution of the high-definition video signal.

The transmission module 12 can be further configured to determine the bandwidth of the band in which the brightness signal is transmitted from a required frame rate and the required horizontal resolution.

The transmission module 12 can be further configured to determine the frequency of the carrier from a preset frequency gap between the band of the intermediate-frequency and the band in which the brightness signal is transmitted.

The device can further include a synchronization module 13;

The synchronization module 13 is configured to couple a clock synchronization signal at a blanking location of the high-definition video signal as a clock source of the chrominance signal for recovering sample.

The high-definition video signal as referred to in the first embodiment to the third embodiment of the invention can be a high-definition video source of mega-pixels or above and can be but will not limited to either of the formats 720P and 1080P.

In the solutions according to the first embodiment to the third embodiment of the invention, the brightness signal and the chrominance signal in the high-definition video signal can be transmitted respectively in the separate bands using the transmission mode of an analog signal to thereby transmit a high-definition video source of mega-pixels or above in real-time and particularly a high-definition video signal in the format of 1280H or 1920H. Furthermore the brightness signal can be transmitted in the baseband and the chrominance signal can be transmitted over the intermediate-frequency carrier. Particularly the analog brightness signal can be transmitted in the baseband with a bandwidth of 0 to fy MHz and the analog chrominance signal, modulated and loaded onto the intermediate-frequency carrier with the frequency of fc MHz, can be transmitted in the bandwidth of fcd MHz. A preset threshold can be configured for transmission over the coaxial cable so that the brightness signal and the chrominance signal can be transmitted in the bands with their highest frequencies no more than the preset threshold to thereby accommodate the attenuating characteristic of the frequency of the signal in the long-distance transmission over the coaxial cable and further guarantee the reliability and the stability of transmission during a long distance transmission. With the solutions according to the embodiments of the invention, the high-definition video signal can be transmitted over a long distance, e.g., at least 300 meters and even more than 500 meters, and the high-definition video signal can be transmitted without any compression, loss of the signal and delay thereof. Moreover with the solutions according to the embodiments of the invention, the problem, of the difficulty to update the original system of the coaxial cable transmission in the solution to transmission over the network after the signal being encoded, can be addressed as well.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of transmitting a video signal, the method comprising:
    separating a first signal and a second signal from the video signal;
    selecting a first band for transmitting the first signal;
    selecting, based on the first band, a second band for transmitting the second signal;
    transmitting the first signal in the first band; and
    transmitting the second signal in the second band,
    wherein:
        the first band and the second band are separate bands,
        the transmitting the first signal in the first band or transmitting the second signal in the second band comprises using a transmission mode of an analog signal, and
        the using a transmission mode of the analog signal comprises:
            converting the first signal into a first quantized value,
            modulating and then loading the second signal onto an intermediate-frequency carrier to generate a second quantized value,
            superimposing the first quantized value the second quantized value to generate a superimposed signal, and
            converting the superimposed signal into the analog signal for transmission.

2. The method of claim 1, wherein a clock synchronization signal is coupled at a blanking location of the video signal as a clock source of the second signal for recovering sample.

3. The method of claim 1, the selecting the first band comprising determining the bandwidth of the first band based on a horizontal resolution of the video signal or a frame rate.

4. The method of claim 1, the selecting the second band comprising determining the bandwidth of the second band based on a color resolution of the video signal.

5. The method of claim 1, wherein the video signal is in at least one format of the format 720P, the format 1080P, the format 1280H, or the format 1920H.

6. The method of claim 1, wherein the transmitting the first signal in the first band or transmitting the second signal in the second band comprises:
    using a transmission mode of an analog signal.

7. The method of claim 1, wherein the first signal comprises a luminance signal, and the second signal comprises a chrominance signal.

8. The method of claim 1, wherein the first band and the second band are no more than a preset threshold, and the preset threshold is no less than 20 MHz.

9. The method of claim 1, wherein the first band and the second band are non-overlapping.

10. The method of claim 1, wherein the selecting the second band for transmitting the second signal comprises:
    determining the frequency of the second band based on a preset frequency gap between the first band and the second band.

11. A device for transmitting a video signal, the device including a processor and being configured to:
    separate a first signal and a second signal from the video signal;
    transmit the first signal in a first band;
    transmit the second signal in a second band;
    convert the first signal into a first quantized value.

12. The device of claim 11, wherein the device is further configured to:
    couple a clock synchronization signal at a blanking location of the video signal as a clock source of the second signal for recovering sample.

13. The device of claim 11, wherein the device is further configured to output the analog signal obtained by conversion onto a coaxial cable for transmission, wherein both the first band and the second band are no more than a preset threshold.

14. The device of claim 11, wherein the device is further configured to
    determine the bandwidth of the first band based on a horizontal resolution of the video signal or a frame rate.

15. The device of claim 11, wherein the device is further configured to
    determine the bandwidth of the second band based on a color resolution of the video signal.

16. The device of claim 11, wherein the device is further configured to
    determine the frequency of the second band based on a preset frequency gap between the first band and the second band.

17. The device of claim 11, wherein the first band and the second band are non-overlapping.

18. The device of claim 11, wherein the video signal is in at least one format of the format 720P, the format 1080P, the format 1280H, or the format 1920H.

* * * * *